Patented Nov. 20, 1934

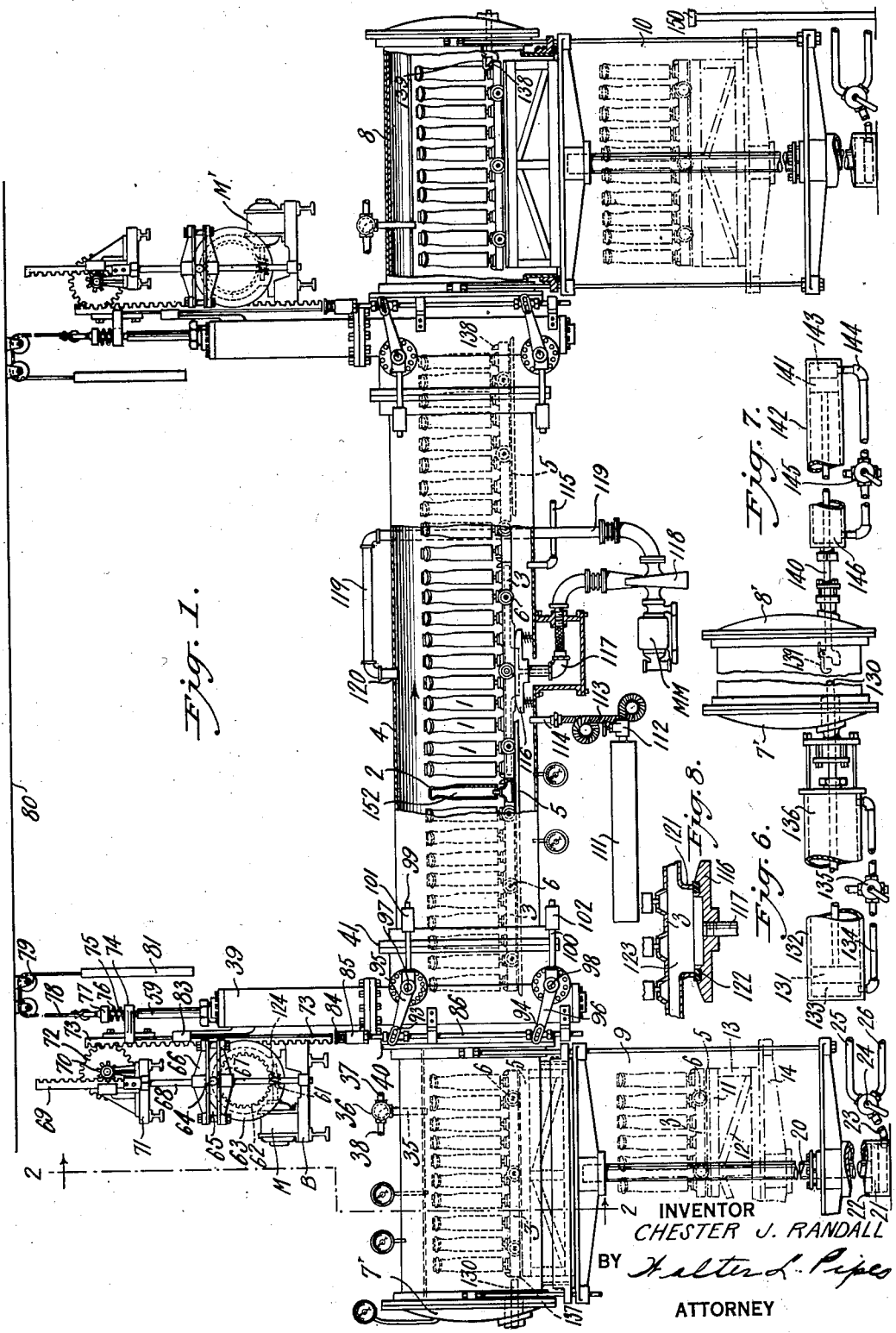

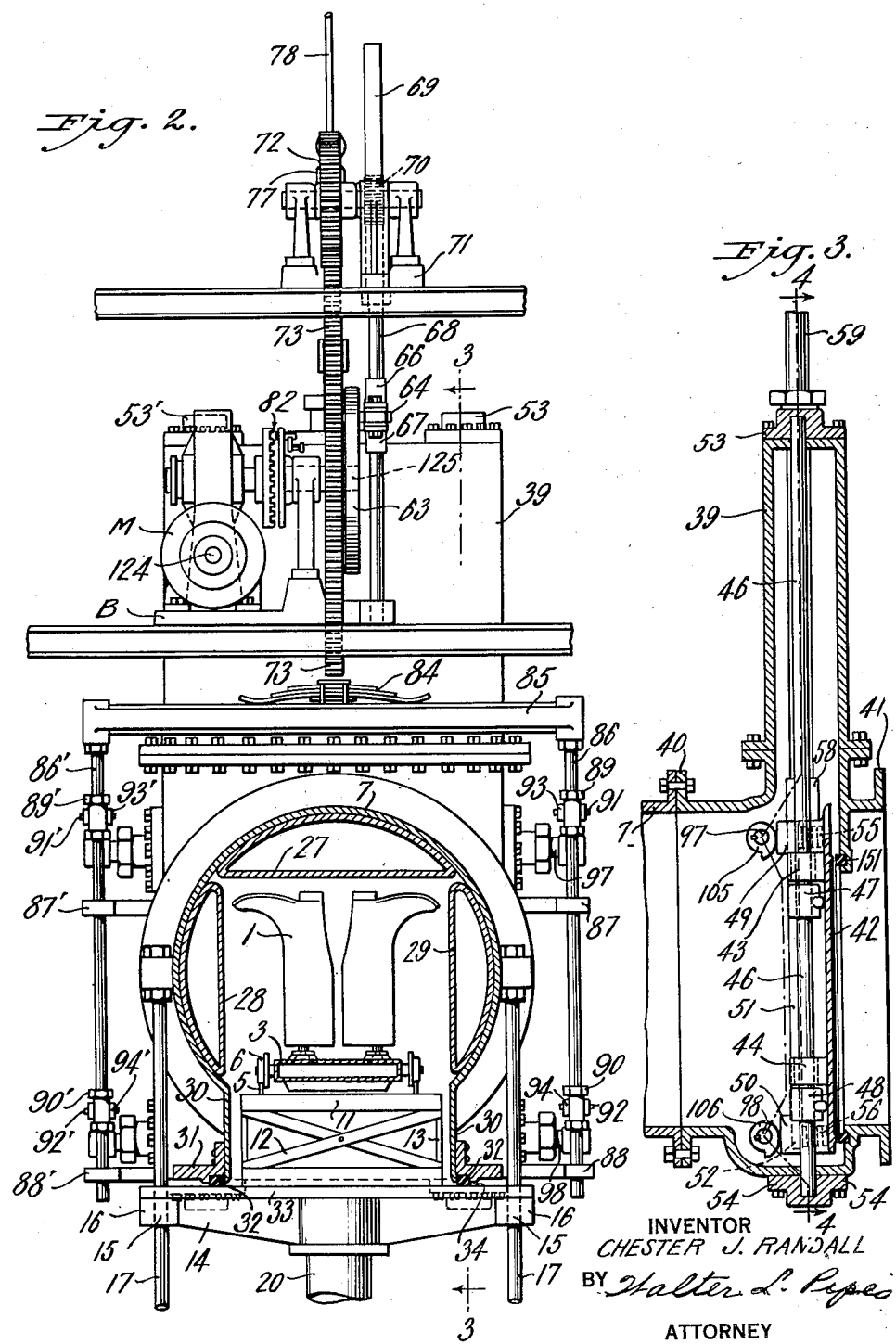

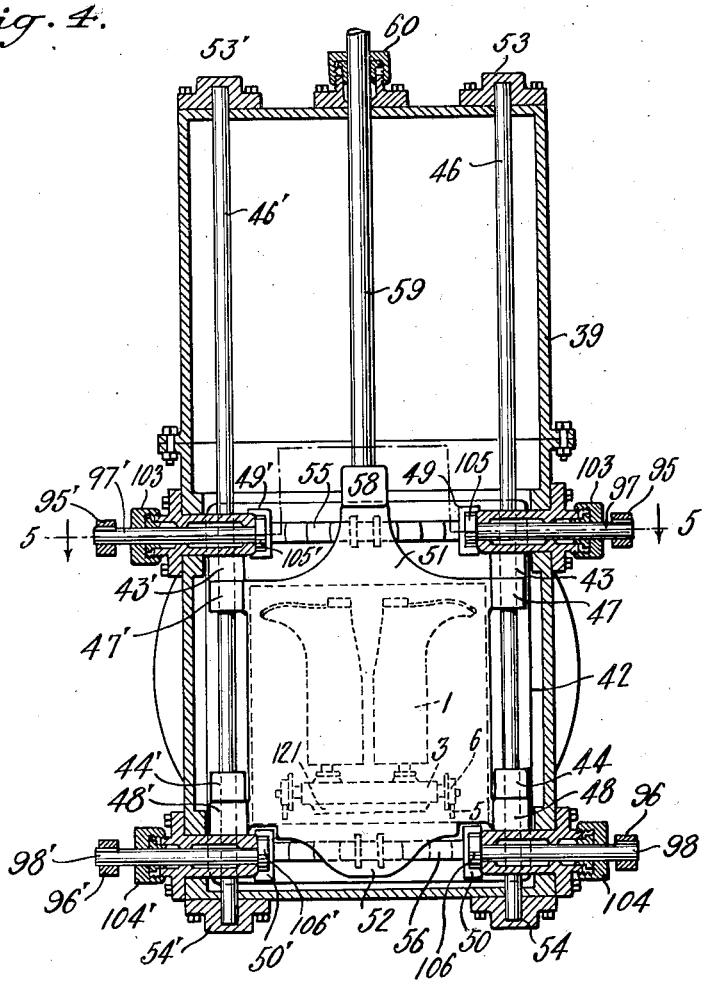
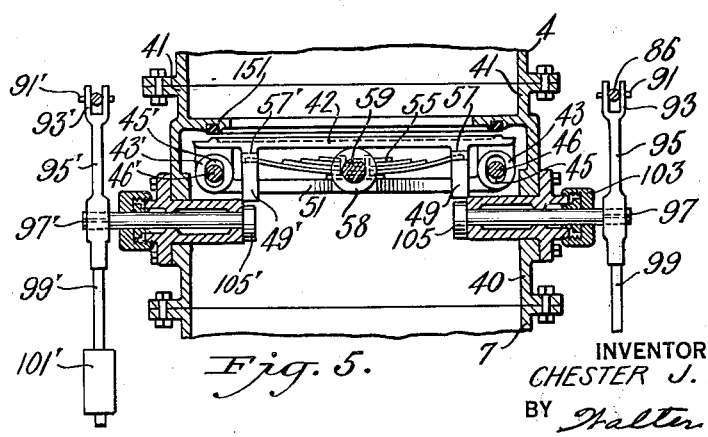

1,981,194

UNITED STATES PATENT OFFICE 1,981,194

VULCANIZING APPARATUS

Chester J. Randall, Naugatuck, Conn., assignor to The Goodyear's India Rubber Glove Mfg. Company, Naugatuck, Conn., a corporation of Connecticut Application April 16, 1932, Serial No. 605,637

15 Claims. (Cl. 18—6)

This invention relates to the art of vulcanizing rubber articles and has for an object the vulcanization of various types of such articles in a more or less continuous manner whereby speed of production is greatly increased concomitantly with the achievement of other commercial advantages.

In the customary vulcanization of rubber articles, for instance rubber footwear, it is the usual practice to load the lasts supporting the footwear articles in an unvulcanized state, onto a car and to convey the car by hand into a large vulcanizing chamber which normally holds several such cars. The chamber is then hermetically sealed and subjected to conditions of heat and pressure suitable for vulcanizing the particular type of goods at hand. This vulcanizing operation ordinarily takes several hours and requires great care in regulating pressures and temperatures as well as entailing a large amount of manual labor handling the articles in charging and discharging the vulcanizer.

In normal rubber footwear manufacture as at present carried out it is necessary to wait until the end of the day when the footwear-making operators have completed their quotas before a sufficient supply of footwear to be vulcanized is available for filling these large vulcanizers to capacity or near capacity. Consequently when speed of production is required it is necessary that vulcanization be carried out after the normal hours when the footwear-making operators perform their work and this sometimes necessitates the operation of the vulcanizers in the evening and during the night, when conditions for efficient factory operation are not ordinarily favorable.

The present invention enables the vulcanization of rubber articles such as footwear in a substantially continuous manner so that relatively small quantities of articles may, on receipt from the assembling operators or apparatus, be placed with their forms on carriages which are intermittently introduced into a vulcanizing chamber and progressively carried therethrough upon the admission of further quantities subsequently supplied on similar carriages. It can be seen therefore that by the use of the present apparatus it is possible to carry out vulcanization substantially continuously with the production of the unvulcanized rubber articles, that is, as a component step in the manufacture of completed articles on a substantially continuous basis, thereby eliminating the loss of time heretofore necessitated in waiting for the accumulation of a sufficient quantity of rubber articles to fill large stationary vulcanizers to capacity.

The invention is particularly adapted to the utilization of the so-called "ammonia cure" whereby ammonia gas is utilized in the vulcanizer to react with the chemical ingredients of the rubber compounds to accomplish quicker and more efficient vulcanization than can be accomplished under normal types of vulcanizing procedure.

By this invention it is possible to obtain vulcanization more uniformly than has heretofore been possible under customary practice. This is accomplished by the utilization of means to maintain an even temperature throughout the mass of goods being vulcanized, or at least to ensure their subjection to substantially uniform conditions throughout their passage.

The invention also aims to effect a saving in ammonia or other gas utilized for vulcanization and eliminates the waste heretofore necessitated by filling and discharging stationary vulcanizers at the completion of each vulcanizing operation. By the present invention, the quantity of gas utilized for vulcanization is substantially maintained in the vulcanizer under conditions of pressure and temperature which are not altered by the introduction or subtraction of rubber goods into or from the vulcanizer.

The invention also does away with the waste in space in storing articles on large cars and increases the efficiency in stripping the articles from the forms at the end of the vulcanizing operation, for instance the stripping of boots or other footwear from forms may be carried out in the daytime and thus be better accomplished and supervised than would be the case if this operation were performed at night. As above indicated the vulcanizing operation may be commenced practically simultaneously with the production of the unvulcanized articles and each charge of articles may be vulcanized in comparatively short periods of time. Other advantages of the invention include the reduction of equipment, particularly lasts such as those necessary for footwear manufacture, by virtue of the fact that the same lasts may now be used several times a day. This also results in a saving in storage space. The number of thermometers, pressure regulators, valves and other component parts of present day vulcanizing control apparatus may be also reduced. Further the operation of an apparatus such as that herein disclosed may be done quite inexpensively as it is possible to so time and coordinate the various means for controlling component operating parts that they may be efficiently operated by only one or two operators.

With the above advantages of the invention in mind, the means of accomplishment will now be described by referring to the drawings which are illustrative of one form in which the invention may be carried out.

Fig. 1 is a side elevation of the main portion of the apparatus with certain parts in section.

Fig. 2 is a section along the line 2—2 of Fig. 1.

Fig. 3 is a section along the line 3—3 of Fig. 2.

Fig. 4 is a section along the line 4—4 of Fig. 3.

Fig. 5 is a section along the line 5—5 of Fig. 4.

Fig. 6 is a fragmentary view of an instrumentality provided at the left hand or entrance end of the apparatus, this device having been cut away from Fig. 1 owing to lack of space.

Fig. 7 is a similar view of the device which is cut away at the right hand or discharge end of the apparatus of Fig. 1.

Fig. 8 is a detail of one of the carriages in contact with the shoe for enabling a differential of pressure to be obtained during passage of the articles through the vulcanizing chamber.

The invention consists briefly in the provision of a vulcanizing chamber readily accessible and communicable with a line of supply for articles to be vulcanized, and means for effecting a continuous vulcanization of such articles while the same are progressively passed through the said chamber. The passage is accomplished by means of carriages 3 which, in the case of rubber boots which are taken as an illustrative example, carry lasts 2 on which are disposed boots 1. These carriages are conveyed through the vulcanizing chamber 4 containing a suitable vulcanizing gas under suitable conditions of temperature and pressure, the direction of travel being indicated by the arrow in Fig. 1. The carriages are arranged to run on tracks 5 and for this purpose are provided with wheels 6 engaging said tracks. Prior to entering the vulcanizing chamber 4 carriages are passed through an entrance chamber 7 arranged to function as an air lock for equalizing the pressure in chambers 4 and 7 preparatory to placing them in communication with each other so that the carriages may be passed from one to the other along the tracks. A similar exit chamber 8 is also provided and similarly arranged so that the carriages may be passed out of the vulcanizing chamber 4. Elevator mechanisms 9 and 10 are provided for bringing the loaded carriages into the entrance chamber 7 and out of the exit chamber 8 respectively. Suitable gates are provided for obtaining fluid tight joints between the chambers, suitable operating and control means being of course provided for operating the gates.

Describing the apparatus more in detail and referring to Fig. 1, forms 2 carrying articles to be vulcanized (for instance lasts carrying rubber boots 1) are disposed upon the carriages 3 which are provided with suitable jacks for carrying the forms. These carriages are arranged to run on wheels 6 engaging tracks 5 for guiding carriages through the apparatus. For want of space tracks for guiding the carriages into their initial position are not shown in Fig. 1 but it can be readily understood that suitable tracks are provided in order to run the carriages on to platform 11 of the elevator device 9, which platform is shown as provided with tracks 5 supported by members 12 and 13 which are fixed to a supporting beam 14. This construction is clear from an inspection of Figs. 1 and 2.

Beam 14 is provided with apertures 15 drilled through bosses 16 for guiding the beams on guides 17 whose ends are fixedly secured in fixed position to appropriate parts of the apparatus framework. These beams are raised and lowered by an hydraulically operated plunger 20 which is connected to a piston 21 reciprocable in cylinder 22. To the bottom of the cylinder is connected a conduit 23 leading through a three-way valve 24 to a source of fluid pressure supply 25 and to a discharge line 26. It is apparent that when the valve is opened to the fluid pressure supply the piston will be moved upwardly and the carriage 3 on platform 11 will be moved up into chamber 7 which permits such movement in the manner hereinafter described. Valve 24 is of course opened to discharge conduit 26 when it is desired to lower the platform.

Chamber 7 is open at the bottom and arranged to be closed by the elevation of the carriage platform to its uppermost limit. The chamber is constructed as shown in Fig. 2 and comprises a casing 7 in which jackets 27, 28 and 29 are provided for the circulation of a fluid for maintaining the chamber at the desired temperature, and for facilitating the building up of pressure. Casing 7 is extended downwardly at 30 and provided at its lower extremity with a flange 31 carrying a gasket 32 of rubber or other suitable sealing material. Arranged on beams 14 is an imperforate plate 33 provided with suitable surfaces 34 for engaging the gasket 32. When the platform is raised to its uppermost position the surfaces 34 engage the gasket 32 and form a tight closure for the entrance chamber 7.

Leading into chamber 7 is a conduit 35 (Fig. 1) connecting a source of air or other suitable gas pressure thereto, for instance from conduit 38. The air or gas admitted at 35 is preferably taken from a source whose temperature may be regulated so that it may be admitted to chamber 7 at a temperature identical with or slightly greater than that in the vulcanizing chamber 4. Preferably the connection is through a three-way valve 36 which may be arranged to allow the chamber 7 to be communicated with a discharge line 37. When the temperature and pressure in the chambers 4 and 7 is equalized by properly regulating the temperature and pressure in chamber 7, the two chambers may be open to communicate with one another as will now be described.

Between the chambers 4 and 7 is provided a casing provided with flanges 40 and 41 arranged to cooperate with and connect to complementary flanges in the casings of chambers 7 and 4 respectively. This construction is shown clearly in Fig. 3. In this casing is provided a gate valve whose construction may be understood by referring to Figs. 3, 4 and 5. It is composed of a gate 42 provided at its rear with brackets 43, 43', 44 and 44' in which are provided elongated slots 45 and 45'. Through these slots extend operating rods 46 and 46' on which rods are slidably disposed enlargements 47, 47', 48 and 48' on backing members 51 having an integral lower projecting portion 52. Rods 46 and 46' terminate at the top and the bottom of the casing 39 in supporting members 53, 53', 54 and 54'. By means of member 58 the backing member 51 is connected to operating rod 59. Connecting the gate 42 and the backing member 51 are leaf springs 55 and 56 which are fixed by suitable shackles to the backing plate 51 and to the projecting portion 52. The ends of the longer leaf of the spring 55 terminate in slots 57 and 57' (see Fig. 5) in extensions 49 and 49' which are integral with and project to the rear of the gate 42. The ends of the longer leaf of the spring 56 are similarly disposed in slots formed in extensions 50 and 50' at the bottom portion of the gate adjacent the integral lower projecting portion 52. The operating rod 59 extends through the top of the casing 39 through suitable glands 60 and is actuated up and down in the manner hereinafter described. It is apparent that upon vertical reciprocation of the rod 59 the backing plate 51 and the gate 42 will be raised and lowered to effect opening and closing the gate. The gate is shifted laterally against the action of springs 55 and 56 and into contact with a gasket 151 provided in casing 39, by means hereinafter to be described. This means is dependent upon the gate raising and lowering mechanism, which will therefore be first explained.

The means for reciprocating the rod 59 to raise and lower the gate 42 comprises a motor M (see Figs. 1 and 2) mounted on a suitable base B. The motor rotates a shaft 124 carrying the worm 61. This meshes with worm wheel 62 on a shaft 125 carrying the plate 63. Plate 63 is provided with a pin 64 adjacent its periphery and this pin operates in a slot 65 provided between beams 66 and 67 fixed to a reciprocable shaft 68, and thus imparts reciprocative motion to said shaft as the plate is rotated. At the upper end of this shaft is a rack 69 meshing with pinion 70 fixed to a suitable shaft arranged in bearings on base 71. On this same shaft is a large pinion 72 which meshes with another rack 73 arranged to move up and down in guides 83. To this latter rack is attached an operating member 74, which is connected through a spring 76 to member 77. Member 77 is fixed to rod 75 which forms an extension of the rod 59. In the upper end of member 77 is an eye through which is threaded a cable 78 which runs over pulleys 79 fixed to a suitable support 80. The other end of the cable 78 is attached to weight 81. By virtue of the above described mechanisms it is apparent that upon operation of the motor a reciprocatory movement will be imparted to rod 59 through plate 63, pin 64, beams 66, 67, shaft 68, rack 69, pinions 70 and 72 and rack 73. As before described this motion will result in the raising or lowering of the gate 42. A suitable clutch 82 (Fig. 2) may be provided to control the operation of the gate closing mechanism. The spring 76 acts to cushion movement imparted to rod 59 and the weight 81 acts as to counterbalance the weight of the gate mechanism.

In order to effect a firm closure of the gate, there is provided a means for imparting a lateral motion thereto to force it against gasket 151 when the gate is in its lowermost position. To accomplish this the gate operating mechanism is so arranged that when rack 73 reaches its lowermost position its end strikes against spring 84 (Figs. 1 and 2) provided on beam 85. At each end of this beam is provided an actuating rod 86 and 86' reciprocating in guides 87, 87', 88 and 88'. To each rod is fixed connections 89, 90, 89' and 90' which are provided with pins 91, 92, 91' and 92'. Around each rod and encircling the said pins are disposed apertured or forked ends 93, 94, 93' and 94' of connecting cranks 95, 96, 95' and 96'. The ends of these cranks are keyed to shafts 97, 97', 98 and 98' and may be extended as at 99 and 100 to carry counterbalancing weights 101 and 102 only two of which are shown in Fig. 1. Shafts 97 and 98 extend through suitable glands 103, 103', 104 and 104' (Figs. 4 and 5) in casing 39 and have affixed to their ends cams 105, 105', 106 and 106' arranged to coact against extensions 49 and 49', 50 and 50' on gate 42. It is apparent from this structure that when the gate closing mechanism reaches its lowermost position rack 73 coacts through spring 84 with beam 85 and lowers rods 86 and 86' which through pins 91, 91', 92 and 92' rotate cranks 95, 95', 96 and 96' in order to effect rotation of cam shafts 97, 97', 98 and 98'. This causes cams 105, 105', 106, 106' to be brought against extensions 49, 49', 50 and 50' so that the gate 42 is pressed inwardly against the action of springs 55 and 56 into tight contact with gasket 151. The inward motion is permitted by virtue of the fact that lateral movement of the gate has been provided for by slots 45 and 45' in gate-supporting brackets 43, 43', 44 and 44'.

The vulcanizing chamber 4 is provided with means to supply thereto an amount of a suitable vulcanization accelerating gas, for instance ammonia. To accomplish this a container 111 may be connected through piping 113 to connecting nipple 114 which extends into the vulcanizing chamber. A valve 112 may be provided to regulate the supply of gas. Pipe 115 may be also led to a suitable discharge line for the purpose of reducing the pressure when desired. It is understood that the chamber 4 is provided with jackets or coils (not shown) for the purpose of circulating a suitable fluid for supplying heat for vulcanization.

In order to obtain a differential of pressure during vulcanization, a shoe 116 (see Figs. 1 and 8) may be yieldably mounted at the bottom of vulcanizing chamber 4 and arranged so that the downwardly depending portions 121 of movable carriages 3 ride over the same and make a tight connection with the source of evacuation, for instance depending portions 121 of the carriages 3 may be arranged to ride over shoe 116 to a position indicated in Figs. 1 and 8 wherein the extremities of the extending portions 121 contact against a rubber washer or sealing ring 122 inset into the shoe. Thus at one point in the succession of movements of carriages 3, one of the carriages will be placed in fluid tight connection with the shoe 116, namely the inside chambers of the carriages 123, (which communicate with the inner portions 152 of the lasts which are suitably perforated) are placed in connection with line 117, which leads to a vacuum pump 118 operated for instance by an electric motor MM. The discharge end of the pump may be led through piping 119 back into the vulcanizing chamber as at 120. Operation of the vacuum system thus effects a differential of pressure between the inner and outer portions of the boots which not only facilitates vulcanization but causes the boot uppers to adhere closely to the last outlines.

In order to initiate movement of the carriages into and out of the vulcanizing chamber, a means such as is illustrated in Figs. 6 and 7 may be utilized. This consists in a plunger 130 extending through the head 7' of the entrance chamber 7, which rod is connected to piston 131 operating in cylinder 132. Each end 133 and 136 of the cylinder 132 is connected by conduit 134 to valve 135 which is arranged to communicate a source of fluid pressure to one end of the chamber while allowing the other end to be connected to the atmosphere. When the valve is so moved the piston is caused to advance and move plunger 130 in the direction desired, for instance as shown in Fig. 6 the valve 135 may be opened to allow pressure into the end 133 of the chamber 132 thus moving piston 131 to the right and causing the plunger to be likewise moved to the right. This plunger abuts against portions 137 of carriages 3 when they are positioned in entrance chamber 7, and after the pressure in the chambers 4 and 7 has been equalized and the gate 42 has been raised, effects movement of the carriage into the vulcanizing chamber 4. The other end or exit end of the vulcanizing chamber is provided with a gate similar in every respect to that described in connection with the gate 42. At this end is also provided an actuating means which operates simultaneously with that described in connection with Fig. 6. This actuating means is shown in Fig. 7 and consists in plunger 140 operated by fluid pressure admitted to and exhausted from the cylinder 142. At the end of the plunger is provided a spring catch 139 which upon movement of the plunger to the left as viewed in Fig. 7, snaps on to catch member 138 one of which is affixed to each carriage 3. It is thus seen that the mechanism shown in Fig. 7 is arranged to positively pull each car from the vulcanizing chamber 4 into the discharge chamber 8 simultaneously with the supply of a new car to vulcanizing chamber 4 from entrance chamber 7.

Upon admission of a carriage into the discharge chamber 8 an elevator mechanism 10 similar in every respect to that described in connection with the entrance chamber 7 is provided to bring the respective carriages down to the position indicated in dot and dash lines at the right of Fig. 1. In this position the carriages may be rolled on to track 150 and brought to the place where the vulcanized articles are desired to be packaged or distributed for shipment.

While the apparatus has been described with particular respect to the operation up to and including the vulcanizing operation, it is to be understood that like mechanisms are provided on the discharge end of the machine to facilitate movement of the vulcanized articles from the vulcanizing chamber to the point where the completed articles are ultimately desired to be brought. While also hand operated means for actuating the various parts of the apparatus have been shown for the purposes of simplicity, it is to be understood that it is within the purview of this invention to provide means for correlating the operation of these actuating means under a master control so that the proper sequence of operations of the respective control valves may be automatically effected. For instance the invention is best accomplished by operation of the actuating means in such a manner that the elevating mechanisms 9 and 10 first arise to chamber-closing position, at which time pressure in the three chambers is equalized. Upon equalization the gate valves 42 at each end of the apparatus are opened and plungers 130 and 140 operated to feed and discharge a carriage to and from the vulcanizing chamber. Withdrawal of the plungers to the position shown in Figs. 6 and 7 then takes place simultaneously with the closing of the gates, after which chambers 7 and 8 are relieved of their pressure and the two elevating mechanisms 9 and 10 moved downwardly, the first to receive the freshly charged carriage and the second to bring a completely vulcanized battery of articles to the dot and dash position of Fig. 1 from whence the carriage may be conveyed to the desired point.

While not intending to limit the invention otherwise than is required by the prior art, the scope of the same is set forth in the appended claims.

Having thus described my invention, what I claim and desire to protect by Letters Patent is:

1. A vulcanizing apparatus comprising in combination, a vulcanizing chamber, a separate chamber adjacent thereto, means for establishing and disestablishing communication between the two chambers, article-carrying means adapted to pass through the chambers, means for conveying said article-carrying means into and for closing said separate chamber, and means for conveying said article-carrying means from one chamber to the other when they are opened for communication.

2. In a vulcanizing apparatus the combination of a vulcanizing chamber, and an entrance chamber communicable therewith, a gate arranged between the two chambers, and means for actuating said gate to substantially opened or closed position, and means associated with said actuating means for moving the gate when in substantially closed position, to seal the connecting passage between the chambers.

3. In a vulcanizing apparatus, the combination of a vulcanizing chamber, an entrance chamber associated therewith, a closure for said entrance chamber, means carried by said closure for carrying articles into said vulcanizing chamber, and means associated with said entrance chamber for conveying articles carried by said closure from the entrance chamber into the vulcanizing chamber when said closure is in closed position.

4. In a vulcanizing apparatus, the combination of a vulcanizing chamber, an entrance chamber associated therewith, a closure for said entrance chamber, means carried by said closure for carrying articles into said vulcanizing chamber, and means associated with said entrance chamber for conveying articles carried by said closure from the entrance chamber into the vulcanizing chamber.

5. A vulcanizing apparatus comprising a vulcanizing chamber, means whereby articles to be vulcanized may be moved through said chamber, and means for applying a differential of pressure to the articles at a predetermined point in their movement through said chamber.

6. A vulcanizing apparatus comprising a vulcanizing chamber, means whereby articles may be moved in a fixed path through said chamber, a circulating means for a gaseous medium having exhaust and discharge openings leading into the chamber, and means whereby the interiors of said articles may be connected to said exhaust opening at a predetermined point in their path through the chamber.

7. A vulcanizing apparatus comprising a vulcanizing chamber, means for moving through the chamber footwear articles mounted on perforated hollow lasts, and means for connecting the interiors of the lasts to an exhaust apparatus at a predetermined point in their movement through the chamber.

8. A vulcanizing apparatus comprising a vulcanizing chamber, means for moving therethrough a series of trucks carrying footwear articles on hollow perforated lasts, each truck having an exhaust outlet communicating with the interiors of its lasts, and means for connecting an exhaust apparatus to said outlet at a predetermined point in the movement of a truck.

9. A vulcanizing apparatus comprising a vulcanizing chamber, an entrance chamber communicating therewith, a closure between the two, an inlet opening to said entrance chamber, a combined article introducing means and closure, and means for moving the same to and from said inlet opening.

10. A vulcanizing apparatus comprising a vulcanizing chamber, an exit chamber communicating therewith, a closure between the two, an outlet opening from said exit chamber, a combined article removing means and closure, and means for moving the same to and from said outlet opening.

11. A vulcanizing apparatus comprising a vulcanizing chamber, entrance and exit chambers communicating therewith, closures between said last named chambers and the vulcanizing chamber, openings leading into said entrance and exit chambers, a combined article introducing means and closure, a combined article removing means and closure, and means for moving said last named closures to and from said openings.

12. A vulcanizing apparatus comprising a vulcanizing chamber, a chamber communicating therewith, a movable closure between said chambers, a seat for said closure, means for moving said closure to approximate closing position, and means actuated by said moving means in its closing movement for subsequently forcing the closure and seat into a hermetical seal.

13. A vucanizing apparatus comprising a vulcanizing chamber, tracks extending therethrough, a chamber communicating with said vulcanizing chamber, an opening leading into said last chamber, and a closure movable to and from a sealing position for said opening, said closure including tracks which are brought into operative alignment with said first tracks when the closure is in its sealing position.

14. A vulcanizing apparatus comprising a vulcanizing chamber, entrance and exit chambers communicating therewith, movable closures between the vulcanizing and said last named chambers, an inlet opening to said entrance chamber, means for contemporaneously supplying unvulcanized articles to said entrance chamber and closing its inlet opening, an outlet opening leading from the exit chamber, a closure therefor, means for contemporaneously moving said last closure to open position and removing vulcanized articles from said exit chamber, means for moving articles through said chambers, and means for applying a pressure differential to said articles at a predetermined point in their movement through said vulcanizing chamber.

15. A vulcanizing apparatus comprising a vulcanizing chamber, means for supplying a vulcanization accelerating medium to said chamber, entrance and exit chambers communicating with said vulcanizing chamber, movable closures between the vulcanization chamber and said last named chambers, means for moving articles to be vulcanized through said chambers, and means in the vulcanization chamber for applying a differential of pressure to said articles at a predetermined point in said vulcanization chamber.

CHESTER J. RANDALL.